Nov. 27, 1923.  1,475,716

C. G. OVERBAUGH ET AL

FRUIT JAR COVER FASTENER AND REMOVER

Filed Aug. 19, 1919

Inventors.
C. G. Overbaugh
Frank Kell
by H. J. S. Dennison att

Patented Nov. 27, 1923.

1,475,716

UNITED STATES PATENT OFFICE.

CRELLAN GRANT OVERBAUGH AND FRANK KELL, OF PORT ROWAN, ONTARIO, CANADA, ASSIGNORS TO ERNEST A. KILLMASTER, OF CLEVELAND, OHIO.

FRUIT-JAR-COVER FASTENER AND REMOVER.

Application filed August 19, 1919. Serial No. 318,517.

*To all whom it may concern:*

Be it known that we, CRELLAN GRANT OVERBAUGH and FRANK KELL, both subjects of the King of Great Britain, and residents of the town of Port Rowan, county of Norfolk, Province of Ontario, in the Dominion of Canada, have invented certain new and useful Improvements in a Fruit-Jar-Cover Fastener and Remover, described in the following specification and illustrated in the accompanying drawings, that form part of the same.

Among the objects of the invention are, to provide a device which will facilitate the handling of fruit jar covers, particularly of the screw top type called "Mason jar" covers which frequently use an external compressible ring, and to provide a device of such character which is very simple in construction and yet very effective for the purpose set forth.

The principal feature of the invention consists in the novel construction of device whereby a circular converging surface is presented to engage and grip the jar cover.

Many gripping devices in the form of clamps of various kinds have been devised for the purpose of securing or loosening fruit jar covers but most of such devices have proved unsuccessful in that the covers are injured by the device and the present invention overcomes this difficulty.

In the drawings Figure 1 is a sectional elevational view of the preferred form of this invention showing the manner of gripping the jar cover or screw top.

Figure 1:
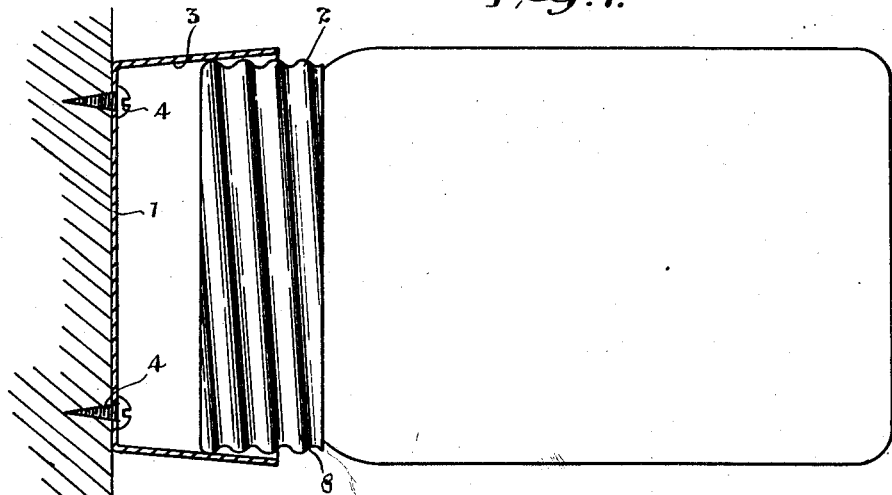
Figure 2:
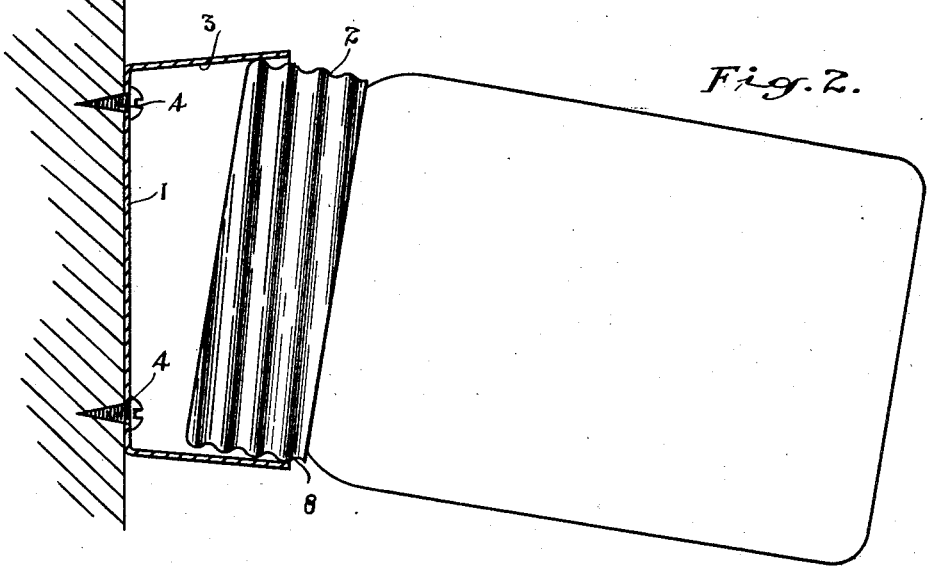
Figure 2 is a sectional elevational view showing the manner of releasing the cover from the device.

The device shown in Figures 1 and 2 comprises a cup or cap shaped member 1 the side wall or circumferential flange of which is formed with a slight convergence toward the closed end. This converging wall is sufficiently large to allow the jar covers 2 to enter freely and engage the surface 3 about midway of its depth.

The cup or cap-shaped member is fastened upon the wall or the underside of a table or shelf or it may be placed on top of a table if desired and is simply secured by the screws 4 which pass through holes in the top.

In using the device, the jar, upon which the cover has been secured fairly tight with the hands, is held in the hands and the cover is inserted into the device until the upper edge of the cover engages the taper snugly. The jar is then turned and the slightly tapered surface of the cup grips the outer circumference of the cover and holds it securely while the jar is screwed tightly into the cover. The loosening of the cover is accomplished in the reverse manner.

In order to release the cover it is merely necessary to tilt the jar slightly as is shown in Fig. 2 and it immediately releases from the gripping contact.

Figure 3:
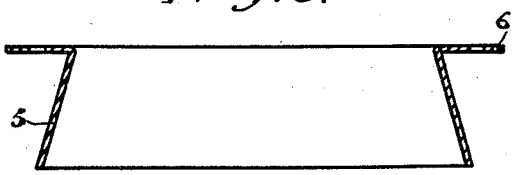
Figure 3 is a sectional elevational view of a modification of the device.

The device may be formed in several ways, one modification being shown in Figure 3 in which the tapered ring 5 is merely flanged outward at the smaller end and the fastening screws are inserted through the flange 6.

It will be understood quite readily that the gripping effect is uniform all around the cover, consequently there is no tendency to distort it and further, the gripping occurs at the strongest part of the cover, that is, at the threaded portion 8.

What we claim as our invention is:—

1. A fruit-jar cover fastener and remover, comprising a circular member having a smooth plane conical surface adapted to frictionally grip the jar cover.

2. A fruit-jar cover fastener and remover, comprising a member having a smooth conical surface adapted to frictionally grip the jar cover, and a transverse flat end surface adapted to be secured to a rigid structure.

3. A fruit-jar cover fastener and remover, comprising a sheet-metal cup having a smooth conical inner wall and screw-holes in the top thereof.

CRELLAN GRANT OVERBAUGH.
FRANK KELL.

Witnesses:
G. M. BROWN,
J. L. BUCK.